United States Patent [19]

Ohno

[11] Patent Number: 5,072,112
[45] Date of Patent: Dec. 10, 1991

[54] METHOD FOR REALIZING A PRIMARY PHOTOMETRIC STANDARD OF OPTICAL RADIATION USING A SILICON PHOTODIODE

[75] Inventor: Yoshihiro Ohno, Ibaraki, Japan
[73] Assignee: Matsushita Electric Industrial Co., Ltd., Osaka, Japan
[21] Appl. No.: 541,731
[22] Filed: Jun. 21, 1990
[51] Int. Cl.⁵ .......................... G01J 3/50; H01J 5/16; H01J 40/14
[52] U.S. Cl. ............................... 250/226; 324/158 D
[58] Field of Search ............... 250/226; 356/213, 218; 324/158 D

[56] References Cited

PUBLICATIONS

"Silicon Photodiode Absolute Spectral Response Self-Calibration Using a Filtered Tungsten Source," Carrol G. Hughes 111, Applied Optics, vol. 21, No. 12, Jun. 15, 1982, pp. 2129–2132.
"Induced Junction (Inversion Layer) Photodiode Self-Calibration"; Robert L. Booker and Jon Geist; Applied Optics, vol. 23, No. 12, Jun. 15, 1984, pp. 1940–1945.
"Sixth Comparison of National Standards of Luminious Intensity and of Luminous Flux (1985)", J. Bonhoure, Metrologia, vol. 24, 1987, pp. 157–162.
"Silicon Photodiode Absolute Spectral Response Self-Calibration" E. F. Zalewski et al., Applied Optics, vol. 19, No. 8, Apr. 15, 1980, pp. 1214–1216.

*Primary Examiner*—David C. Nelms
*Assistant Examiner*—John R Lee
*Attorney, Agent, or Firm*—Wenderoth, Lind & Ponack

[57] ABSTRACT

In a method for realizing a photometric standard of optical radiation based on an absolute responsivity for a photometric quantity, there are measured using a beam of light projected from a white light source through an optical filter for the spectral luminous efficacy correction onto a silicon photodiode, a surface reflectance of the silicon photodiode, a recombination loss in a rear region beyond a depletion layer thereof, and a recombination loss in the vicinity of a boundary region between an insulating layer and a silicon layer thereof, which are independent of the wavelength λ of light. Thereafter, there is calculated an absolute responsivity [A/lm] for a photometric quantity [lm] of a photodetector composed of the silicon photodiode and the optical filter, from the measured surface reflectance of the silicon photodiode and the measured recombination losses thereof.

4 Claims, 2 Drawing Sheets

METHOD FOR REALIZING A PRIMARY PHOTOMETRIC STANDARD OF OPTICAL RADIATION USING A SILICON PHOTODIODE

BACKGROUND OF THE INVENTION

1. Field of the Invention

The present invention relates to a method for realizing a primary photometric standard of optical radiation, and more particularly, to a method for realizing a primary photometric standard of a photometric unit, such as the candela (cd) or lumen (lm) using a silicon photodiode.

2. Description of Related Art

Conventionally, the primary standard of the photometric units is realized by using a black body furnace made based on the Planck's law of radiation, an absolute radiometer for measuring an optical power by substituting the optical power with an electric power, or a synchrotron. In these methods, in order to measure an optical power at an accuracy which is high enough for a primary standard, it is necessary to provide large-scale equipment and employ high technology techniques, and it can be performed only in the national research organizations. However, it was apparent from the result of recent international comparison that the accuracy obtained by the primary standard provided by the national research organizations is only about ±1 % (See a reference 1 : Metrologia, Vol. 24, 1987, pp157). Therefore, it has been desired to improve the accuracy of the primary standard provided thereby.

Further, the primary standard realized as described above becomes the national standard, and is provided to the industrial level through a public organization. In the industrial level, the standard management section of each company etc. performs the calibration of measuring instruments. In such a traceability process, since it is repeated to transfer a luminous intensity of standard lamps referring to the higher level standard lamps, the accuracy obtained in the end measuring instrument becomes lower.

In order to overcome the aforementioned problems, there has been developed a new method which is called "the self-calibration method using a silicon photodiode" as a method for realizing the primary standard of the optical radiation with a high accuracy (See a reference 2 : Applied Optics Vol. 19, No. 8, 1980, pp1214). In the self-calibration method using the silicon photodiode, an absolute responsivity [A/W] of the silicon photodiode is obtained by measuring the surface reflectance and the internal quantum efficiency of the silicon photodiode, and it is confirmed that an accuracy in the order of 0.1 % is obtained, which is one digit higher than that obtained by the conventional primary standard of the optical radiation. This method requires comparatively simple equipment. It has been supposed that the aforementioned self-calibration method using the silicon photodiode is promising as a new method for realizing the primary photometric standard.

However, since the conventional self-calibration method is fundamentally the method for obtaining the absolute responsivity [A/W] at one wavelength of a monochromatic light by projecting the monochromatic light onto the silicon photodiode, in order to realize the photometric standard, it is necessary to measure the absolute responsivity $R(\lambda)$ over the entire visible spectrum using the self-calibration method. After measuring the absolute responsivity $R(\lambda)$, there can be calculated the responsivity $R_{LF}$[A/lm] for the photometric quantity using the following equation by combination of the silicon photodiode and a filter for spectral luminous efficacy correction whose spectral transmittance $\tau(\lambda)$ has been accurately measured, resulting in a photometric standard.

$$R_{LF} = \frac{\int_0^\infty P(\lambda) \cdot R(\lambda) \cdot \tau(\lambda) \, d\lambda}{K_m \cdot \int_0^\infty P(\lambda) \cdot V(\lambda) \, d\lambda} \quad [A/lm] \tag{1}$$

where $P(\lambda)$ is a relative spectral distribution of a light source, $V(\lambda)$ is a standard spectral luminous efficiency, and $K_m$ is a maximum spectral luminous efficacy (683 [lm/W]).

However, in this method, in order to obtain the absolute spectral responsivity on the visible spectrum, it is necessary to prepare many light sources for projecting monochromatic lights of various wavelengths, and to perform the measurement according to the self-calibration method at the respective wavelengths. Accordingly, it is necessary to prepare laser light sources having many wavelengths and the equipment of the self-calibration method. Further, since it takes a long time to perform the aforementioned measurement, the conventional self-calibration method is not a simple measuring method for practical use.

SUMMARY OF THE INVENTION

An essential object of the present invention is to provide a method for realizing a primary photometric standard of a photometric unit, such as the candela (cd) or lumen (lm), which is more simple than the conventional methods.

Another object of the present invention is to provide a method capable of realizing a primary photometric standard of a photometric unit, using equipments more simple than those of the conventional methods.

A further object of the present invention is to provide a method capable of realizing a primary photometric standard of a photometric unit for a measuring time shorter than that of the conventional methods.

In order to accomplish the above objects, according to a first method of one aspect of the present invention, there are employed a silicon photodiode and an optical filter having a transparent region within the visible region and having a spectral transmittance $\tau(\lambda)$, and a beam of light projected from a white light source having a spectral distribution $P(\lambda)$ through the optical filter is incident onto the silicon photodiode. Then, there are measured a surface reflectance $\rho_g$ of the silicon photodiode, a recombination loss $\xi_{Rg}$ in a rear region beyond a depletion layer thereof, and a recombination loss $\xi_{og}$ in the vicinity of a boundary region between an $SiO_2$ layer and a silicon layer thereof, which are independent of the wavelength $\lambda$ of light. When a photodetector is constituted by combining the silicon photodiode with the optical filter, an absolute responsivity $R_{LF}$[A/lm] for a photometric quantity [lm] of the photodetector is expressed by the following equation:

$$R_{LF} = \tag{2}$$

-continued $$\frac{(1-\xi_{Rg})\cdot(1-\xi_{og})\cdot(1-\rho_g)\int_0^\infty P(\lambda)\cdot\tau(\lambda)\cdot\lambda/k\,d\lambda}{K_m\int_0^\infty P(\lambda)\cdot V(\lambda)\,d\lambda}$$

where $k = 1.24 \times 10^3 [\text{nm·W·A}^{-1}]$, $K_m$ is a maximum spectral luminous efficacy (683 [lm/W]), and $V(\lambda)$ is a standard spectral luminous efficiency.

Then, there can be calculated a luminous intensity [lm] of a beam of light incident onto the photodetector from an output current [A] of the photodetector, and a photometric standard of optical radiation can be realized.

According to a second method of another aspect of the present invention, there is used a white light source having an emitting spectral distribution only within the visible region and having a relative spectral distribution $P(\lambda)$. It is not necessary to use the aforementioned optical filter, and in other words, the transmittance of the optical filter can be one. Then, the responsivity $R_{LF}$ [A/lm] for the photometric quantity [lm] composed of only the silicon photodiode is expressed by the following equation:

$$R_{LF} = \frac{(1-\xi_{Rg})\cdot(1-\xi_{og})\cdot(1-\rho_g)\int_0^\infty P(\lambda)\cdot\lambda/k\,d\lambda}{K_m\int_0^\infty P(\lambda)\cdot V(\lambda)\,d\lambda} \quad (3)$$

Then, there can be calculated a luminous intensity [lm] of a beam of light incident onto the silicon photodiode from an output current [A] thereof, and a photometric standard of optical radiation can be realized.

In the aforementioned first and second methods, when the surface reflectance $\rho_g$ of the silicon photodiode is measured, there is used a photodetector having a relative spectral responsivity $R_m(\lambda)$ expressed by the following equation (4) within the transparent region of the optical filter:

$$R_m(\lambda) \approx C_0\sqrt{\lambda} \quad (4)$$

where $C_0$ is a constant.

The, the aforementioned responsivity $R_{LF}$ can be calculated with the highest accuracy.

In the aforementioned first and second methods, it is not necessary to generate many monochromatic lights having various wavelengths, and to repeat the measurement according to the conventional self-calibration method at the respective wavelengths. The photometric standard of optical radiation can be realized based on the self-calibration method using the silicon photodiode by one measurement using the white light source, and the measuring system therefor becomes more simple than that of the conventional method. Therefore, a primary photometric standard of optical radiation can be realized with a high accuracy using a simple measuring system by a simple operation.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

First Preferred Embodiment

Figure 1A:
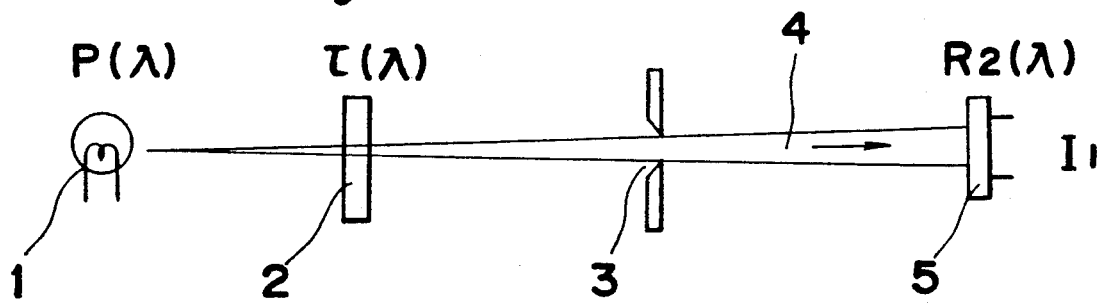
FIGS. 1a and 1b are schematic diagrams showing a method for measuring a surface reflectance of a sample silicon photodiode according to a first preferred embodiment of the present invention.

A first preferred embodiment according to the present invention will be described below with reference to equations and the attached drawings.

In the conventional self-calibration method using the silicon photodiode, an absolute responsivity $R(\lambda)$ of a silicon photodiode can be calculated using the following equation by measuring a surface reflectance $\rho(\lambda)$ of the silicon photodiode, a recombination loss $\{1-\epsilon_R(\lambda)\}$ of electron and hole pairs in a rear region beyond a depletion layer thereof, and a recombination loss of electron and hole pairs in the vicinity of a boundary region between an SiO$_2$ layer and a silicon P-layer (See reference 2).

$$R(\lambda) = \epsilon(\lambda)\cdot\lambda\cdot\{1-\rho(\lambda)\}/k \quad [\text{A/W}] \quad (5)$$

where $k = 1239.85 [\text{nm·W·A·}^{-1}]$, and $\epsilon(\lambda)$ is an internal quantum efficiency of the photodiode, which is expressed by the following equation:

$$\epsilon(\lambda) = \frac{\epsilon_R(\lambda)\cdot\epsilon_o(\lambda)}{1 - \{1-\epsilon_o(\lambda)\}\cdot\{1-\epsilon_R(\lambda)\}} \quad (6)$$

Therefore, if the absolute responsivity $R(\lambda)$ is calculated over the entire visible spectrum from 380 nm to 780 nm, the responsivity $R_{LF}$ for the photometric quantity [lm] can be calculated using the following equation of the conventional method by the combination of the above silicon photodiode and an optical filter for spectral luminous efficacy correction having a known spectral transmittance $\tau(\lambda)$ (referred to as a $V(\lambda)$-correction filter hereinafter).

$$R_{LF} = \frac{\int_0^\infty P(\lambda) \cdot R(\lambda) \cdot \tau(\lambda) \, d\lambda}{K_m \cdot \int_0^\infty P(\lambda) \cdot V(\lambda) \, d\lambda} \quad [A/lm] \quad (7)$$

where $P(\lambda)$ is a relative spectral distribution of a light source, $V(\lambda)$ is a standard spectral luminous efficiency, and $K_m$ is a maximum spectral luminous efficacy (683 [lm/W]).

In a general PN type silicon photodiode, since respective quantum efficiencies $\epsilon_R$ and $E_o$ are 0.99 or more in the visible spectrum, the error in the quantum efficiency $\epsilon(\lambda)$ can be nearly neglected when the above equation (6) is approximated by the following equation:

$$\epsilon(\lambda) \approx \epsilon_R(\lambda) \cdot \epsilon_o(\lambda) \quad (8)$$

Substituting the equation (8) into (5) gives the following equation:

$$R(\lambda) = \epsilon_R(\lambda) \cdot \epsilon_o(\lambda) \cdot \{1 - \rho(\lambda)\} \cdot \lambda/k \quad (9)$$

The recombination loss $\xi_R(\lambda)$ in the rear region beyond the depletion layer of the silicon photodiode and the recombination loss $\xi_o(\lambda)$ in the vicinity of the boundary region between the SiO$_2$ layer and the P-layer thereof are expressed by the following equations:

$$\xi_R(\lambda) = 1 - \epsilon_R(\lambda) \quad (10)$$

$$\xi_o(\lambda) = 1 - \epsilon_o(\lambda) \quad (11)$$

Thus, the equation (9) is expressed by the following equation:

$$R(\lambda) = \{1 - \xi_R(\lambda)\} \cdot \{1 - \epsilon_o(\lambda)\} \cdot \{1 - \xi(\lambda)\} \cdot \lambda/k \quad (12)$$

Figure 2:
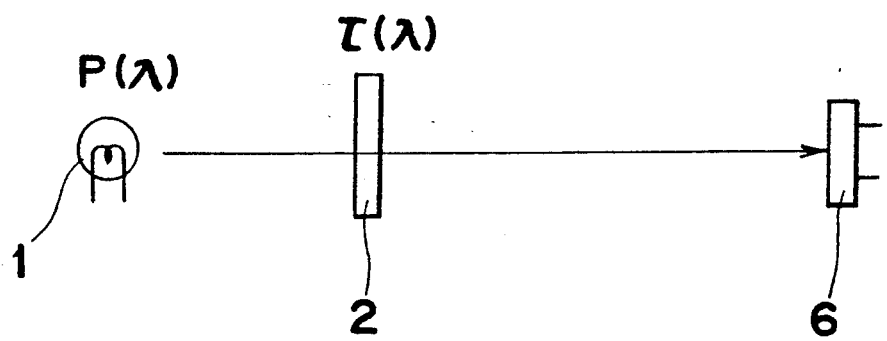
FIG. 2 is a schematic diagram showing a method for measuring a recombination loss in the rear region beyond a depletion layer of the sample silicon photodiode by the reverse bias method.
Figure 5:
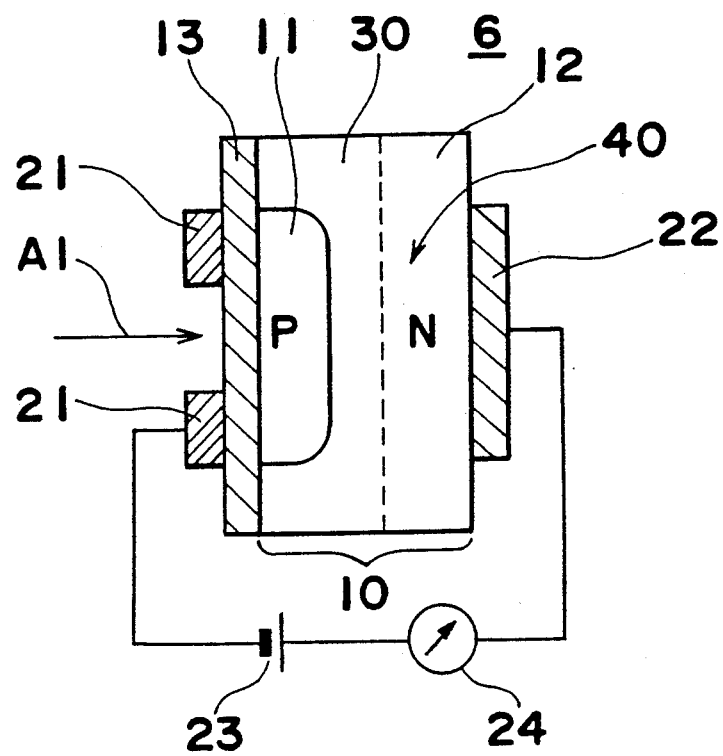
FIG. 5 is a cross sectional view of the sample silicon photodiode showing a composition of the sample silicon photodiode and a method for measuring an output current thereof on the condition of a predetermined reverse bias voltage.

After substituting the equation (12) into the equation (7), the equation (7) is developed with respect to $\{1 - \xi_R(\lambda)\}$, and the following equation can thus be obtained.

$$R(\lambda) = \frac{Da}{K_m \cdot \int_0^\infty p(\lambda) \cdot V(\lambda) \, d\lambda} \quad (13)$$

where $Da = \int_0^\infty P(\lambda) \cdot \tau(\lambda) \cdot \epsilon_o(\lambda) \cdot \{1 - \rho(\lambda)\} \cdot \lambda/k \, d\lambda - \int_0^\infty P(\lambda) \cdot \tau(\lambda) \cdot \epsilon_o(\lambda) \cdot \{1 - \rho(\lambda)\} \cdot \epsilon_R(\lambda) \cdot \lambda/k \, d\lambda.$ FIG. 2 is a schematic diagram showing a method for measuring the recombination loss $\xi_{Rg}$ in the rear region beyond the depletion layer of a sample silicon photodiode 6 by the reverse bias method (See the above reference 2), and FIG. 5 is a cross sectional view showing a composition of the sample silicon photodiode 6 and a method for measuring an output current thereof.

Referring to FIG. 2, there are aligned a white light source 1 having a relative spectral distribution $P(\lambda)$, a $V(\lambda)$-correction filter 2 having a spectral transmittance $\tau(\lambda)$, and the sample silicon diode 6 located on the optical axis. In the measuring system, a beam of light projected from the white light source 1 is incident through the $V(\lambda)$-correction filter 2 onto the sample silicon photodiode 6.

Referring to FIG. 5, a P-layer 11 is formed by injecting impurity ions into an N type silicon substrate 10, and an SiO$_2$ insulating layer 13 is formed on the P-layer 11. Thereafter, an anode electrode 21 is formed on the SiO$_2$ layer 13, and a cathode electrode 22 is formed on the back side of the silicon substrate 10, resulting in a sample PN type silicon photodiode 6 comprising the silicon P-layer 11 and a silicon N-layer 12. A reverse direct-current voltage is applied between the electrodes 21 and 22 through an ampere meter 24 by a battery 23, and then, a depletion layer 30 is formed between the P-layer 11 and the N-layer 12. Further, a beam of light projected from the white light source 1 through the $V(\lambda)$-correction filter 2 is incident onto the P-layer 11 in a direction as indicated by an arrow A1.

Then, the recombination loss $\xi_{Rg}$ in the rear region 40 beyond the depletion layer 30 of the sample silicon photodiode 6 is measured by the reverse bias method known to those skilled in the art wherein an increase in the output current thereof is measured using the ampere meter 24 when the reverse voltage is changed from zero V to a predetermined positive voltage as shown in FIG. 5.

The measured recombination loss $\xi_{Rg}$ in the rear region 40 beyond the depletion layer 30 is expressed by the following equation:

$$\xi_{Rg} = \frac{\int_0^\infty P(\lambda) \cdot \tau(\lambda) \cdot \{1 - \rho(\lambda)\} \cdot \epsilon_0(\lambda) \cdot \xi_R(\lambda) \cdot \lambda/k \, d\lambda}{\int_0^\infty P(\lambda) \cdot \tau(\lambda) \cdot \{1 - \rho(\lambda)\} \cdot \epsilon_0(\lambda) \cdot \lambda/k \, d\lambda} \quad (14)$$

Substituting the relationship of the equation (14) into the equation (13) gives the following equation:

$$R_{LF} = \frac{(1 - \xi_{Rg}) \cdot \int_0^\infty P(\lambda) \cdot \tau(\lambda) \cdot \epsilon_0(\lambda) \cdot \{1 - \rho(\lambda)\} \cdot \lambda/k \, d\lambda}{K_m \cdot \int_0^\infty P(\lambda) \cdot V(\lambda) \, d\lambda} \quad (15)$$

Figure 3:
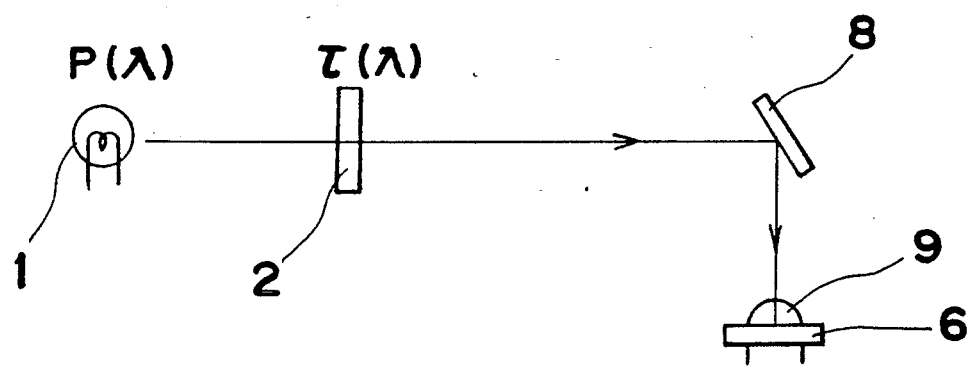
FIG. 3 is a schematic diagram showing a method for measuring a recombination loss in the vicinity of a boundary region between an SiO$_2$ layer and a P-layer of the sample silicon photodiode by the oxide bias method.

FIG. 3 is a schematic diagram showing a method for measuring a recombination loss $\xi_{og}$ in the vicinity of the boundary region between the SiO$_2$ layer 13 and the P-layer 11 of the sample silicon photodiode 6.

Referring to FIG. 3, there are provided the white light source 1, the $V(\lambda)$-correction filter 2, a mirror 8, and the sample silicon photodiode 6. Then, a water droplet 9 is arranged on the incident surface of the sample silicon photodiode 6.

In this measuring system shown in FIG. 3, a beam of light projected from the white light source 1 passes through the $V(\lambda)$-correction filter 2, is reflected by the mirror 8, and then, is incident through the water droplet 9 onto the incident surface of the sample photodiode 6. The recombination loss $\xi_{og}$ in the vicinity of the boundary region between the SiO$_2$ layer 13 and the P-layer 11 of the sample silicon photodiode 6 is measured by the oxide bias method (See the above reference 2) using the measuring system shown in FIG. 3, wherein there is measured a current outputted from the sample photodiode 6 under the condition that a predetermined bias voltage is applied between the anode electrode 21 of the sample photodiode 6 and the water droplet 9.

Developing the equation (15) with respect to $\{1-\xi_O(\lambda)\}$ in a manner similar to that of the equations (13) to (15) gives the following equation:

$$R_{LF} = \frac{(1-\xi_{Rg})\cdot(1-\xi_{og})\int_0^\infty P(\lambda)\cdot\tau(\lambda)\cdot\{1-\rho(\lambda)\}\cdot\lambda/k\,d\lambda}{K_m \cdot \int_0^\infty P(\lambda)\cdot V(\lambda)\,d\lambda} \quad (16)$$

where the recombination loss $\xi_{og}$ in the vicinity the boundary region between the $SiO_2$ layer 13 and the silicon P-layer 11 of the sample silicon photodiode 6 is measured by the aforementioned oxide bias method, and is expressed by the following equation:

$$\xi_{og} = \frac{\int_0^\infty P(\lambda)\cdot\tau(\lambda)\cdot\epsilon_R(\lambda)\cdot\xi_O(\lambda)\cdot\{1-\rho(\lambda)\}\cdot\lambda/k\,d\lambda}{\int_0^\infty P(\lambda)\cdot\tau(\lambda)\cdot\epsilon_R(\lambda)\cdot\{1-\rho(\lambda)\}\cdot\lambda/k\,d\lambda} \quad (17)$$

The quantum efficiency $\epsilon_R(\lambda)$ in the rear region 40 beyond the depletion layer 30 which exists in the equation (17) is approximately about 1 in the visible spectrum as described above. Therefore, after substituting the quantum efficiency $\epsilon_R(\lambda)=1$ into the equation (17), substituting the equation (17) into the equation (15) gives the equation (16).

Thereafter, developing the term $\{1-\rho(\lambda)\}$ in the equation (16) gives the following equation:

$$R_{LF} = \frac{Db}{K_m \cdot \int_0^\infty P(\lambda)\cdot V(\lambda)\,d\lambda} \quad (18)$$

where $Db = (1-\xi_{Rg})\cdot(1-\xi_{og})\cdot$ $$\left\{\int_0^\infty P(\lambda)\cdot\tau(\lambda)\cdot\lambda/k\,d\lambda - \int_0^\infty P(\lambda)\cdot\tau(\lambda)\cdot\rho(\lambda)\cdot\lambda/k\,d\lambda\right\}.$$

Figure 1B:
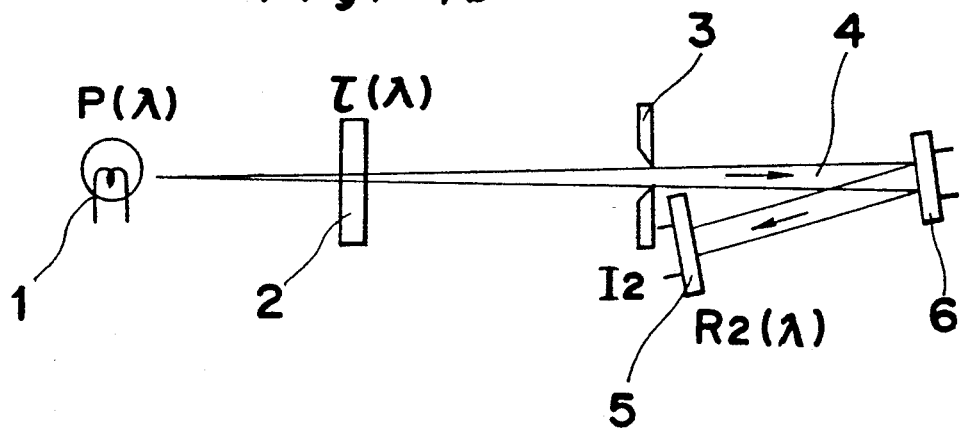

FIGS. 1a and 1b are schematic diagrams showing a method for measuring a surface reflectance of the sample silicon photodiode 6.

Referring to FIGS. 1a and 1b, there are aligned on the optical axis, the white light source 1 having the relative spectral distribution $P(\lambda)$, the $V(\lambda)$-correction filter 2 for correcting the spectral luminous efficacy o having the spectral transmittance $\tau(\lambda)$ which is arranged at a position close to the white light source 1, and an aperture 3 so as to obtain a beam of light 4.

First, as shown in FIG. 1a, a beam of light 4 is projected onto a reference photodiode 5 having a relative spectral responsivity $R_2(\lambda)$, and then, there is measured an output current $I_1$ flowing between the anode electrode and the cathode electrode of the reference photodiode 5 under the condition of no bias voltage. Thereafter, as shown in FIG. 1b, a beam of light 4 is projected onto the sample photodiode 6, and then, a beam of light reflected from the sample photodiode 6 is received by the reference photodiode 5. At that time, there is measured an output current $I_2$ flowing between the anode electrode and the cathode electrode of the reference photodiode 5 under the condition of no bias voltage.

The measured output currents $I_1$ and $I_2$ are expressed by the following equations, respectively:

$$I_1 = C_1 \int_0^\infty P(\lambda)\cdot\tau(\lambda)\cdot R_2(\lambda)\,d\lambda \quad (19)$$

$$I_2 = C_1 \int_0^\infty P(\lambda)\cdot\tau(\lambda)\cdot\rho(\lambda)\cdot R_2(\lambda)\,d\lambda \quad (20)$$

where $C_1$ is a constant.

After measuring the above output currents $I_1$ and $I_2$ as shown in FIGS. 1a and 1b, the ratio of the current $I_2$ to the current $I_1$ is defined as a surface reflectance $\rho_g$ of the sample photodiode 6 for a light source having a relative spectral distribution $P(\lambda)\cdot\tau(\lambda)$ which is composed of the white light source 1 and the $V(\lambda)$-correction filter 2, and is expressed by the following equation:

$$\rho_g = \frac{I_2}{I_1} \quad (21)$$

$$= \frac{\int_0^\infty P(\lambda)\cdot\tau(\lambda)\cdot\rho(\lambda)\cdot R_2(\lambda)\,d\lambda}{\int_0^\infty P(\lambda)\cdot\tau(\lambda)\cdot R_2(\lambda)\,d\lambda}$$

The relative spectral responsivity $R_2(\lambda)$ of the reference photodiode 5 is approximately expressed by the following equation:

$$R_2(\lambda) \approx C_2\cdot/k \quad (22)$$

where $C_2$ is a constant.

In the above equation (22), $\lambda/k$ is a spectral responsivity of an ideal photodiode having an internal quantum efficiency of 100 % and a surface reflectance of zero. Applying the approximate equation (22) into the equation (21) gives the following equation:

$$\rho_g \approx \frac{\int_0^\infty P(\lambda)\cdot\tau(\lambda)\cdot\rho(\lambda)\cdot\lambda/k\,d\lambda}{\int_0^\infty P(\lambda)\cdot\tau(\lambda)\cdot\lambda/k\,d\lambda} \quad (23)$$

Substituting the equation (23) into the equation (18) gives the following equation:

$$R_{LF} = \quad (24)$$

$$\frac{(1-\xi_{Rg})(1-\xi_{og})(1-\rho_g)\int_0^\infty P(\lambda)\cdot\tau(\lambda)\cdot\lambda/k\,d\lambda}{K_m\int_0^\infty P(\lambda)\cdot V(\lambda)\,d\lambda}\,[A/lm]$$

As is apparent from the equation (24), it is not necessary to measure the quantum efficiencies $\epsilon_R(\lambda)$ and $\epsilon_O(\lambda)$ of the photodiode and the surface reflectance $\rho(\lambda)$ thereof. Therefore, if the relative spectral distribution P(λ) of a white light source to be calibrated is known, there can be calculated a responsivity $R_{LF}$ [A/lm] for a photometric quantity of the combination of the sample silicon photodiode 6 and the V(λ)-correction filter 2 by respectively once measuring the recombination loss $\epsilon_{Rg}$ in the rear region 40 beyond the depletion layer 30 of the sample silicon photodiode 6, the recombination loss $\xi_{og}$ in the vicinity of the boundary region between the SiO$_2$ layer 13 and the P-layer 11 thereof, and the surface reflectance $\rho_g$ thereof.

After calculating the responsivity $R_{LF}$ [A/lm], the combination of the sample silicon photodiode 6 and the V(λ)correction filter 2 is combined with a precision aperture having a known aperture dimension Aa [m$^2$] so that the precise aperture opposes to the effective sensitivity region of the sample silicon photodiode 6. Then, a responsivity $R_{ILL}$ for an illuminance [1×] can be calculated using the following equation:

$$R_{ILL} = Aa \cdot R_{LF} [A/1\times] \qquad (25)$$

After measuring a distance L [m] between the light source to be calibrated and the precision aperture, there is calculated a luminous intensity I [cd] of the light source using the following equation with an output current $I_o$ [A] of the sample silicon photodiode 6.

$$I = \frac{I_o}{L^2 \cdot R_{ILL}} [cd] \qquad (26)$$

Thus, there can be realized a photometric standard based on the above calculation of the responsivity $R_{LF}$ [A/lm] for the photometric quantity according to the equation (24).

Further, if there is used a PN type silicon photodiode having a structure suitable for the self-calibration as the sample silicon photodiode 6, the recombination loss $\xi_{Rg}$ in the rear region 40 beyond the depletion layer 30 thereof can be neglected since the quantum efficiency $\epsilon_R$ therein is 0.998 or more on the visible spectrum. Furthermore, if there is used an inversion layer type photodiode (See reference 3 Robert L. Booker et al., "Induced junction (inversion layer) photodiode self-calibration", Applied Optics, Vol. 23, No. 12, June 15, 984) as the sample silicon photodiode 6, the recombination loss $\xi_{og}$ in the SiO$_2$ layer 13 and the P-layer 11 thereof can be approximately expressed by zero since there is theoretically no recombination loss caused in the SiO$_2$ layer 13 and the P-layer 11 thereof.

Therefore, both of the recombination losses $\xi_{Rg}$ and $\xi_{og}$ can be approximately expressed by zero if the aforementioned inversion layer type photodiode is used under the condition that a predetermined reverse bias voltage is applied thereto, and then, the responsivity for the photometric quantity is expressed by the following equation:

$$R_{LF} = \frac{(1-\rho_g)\int_0^\infty P(\lambda) \cdot \tau(\lambda) \cdot \lambda/k \, d\lambda}{K_m \int_0^\infty P(\lambda) \cdot V(\lambda) \, d\lambda} \qquad (27)$$

As a result, the self-calibration can be performed more easily.

When a predetermined reverse bias voltage is applied to the inversion layer type photodiode, the signal-to-noise ratio thereof may decrease steeply. However, if a white light source is used, a beam of light having a larger optical energy is projected onto the photodiode, and then, the problem of the decrease in the signal-to-noise ratio can be dissolved.

The equation (24) is effective on the condition of the approximate equation (22). The error in the calculated responsivity $R_{LF}$ for the photometric quantity due to the above approximation will be described below.

Many silicon photodiodes have a larger spectral responsivity as the wavelength of light is increased, and have a relative spectral responsivity approximately equal to the right side of the equation (22). Therefore, if the silicon photodiode is used as the reference photodiode 5 upon measuring the surface reflectance of the sample silicon photodiode 5, a certain satisfied accuracy in the responsivity can be obtained without other considerations. However, in order to obtain the highest accuracy therein, it is necessary to use as the reference photodiode 5 a silicon photodiode having a characteristic which satisfies the equation (22), namely, having a high internal quantum efficiency and a less selectivity on the wavelength of the surface reflectance.

In the first preferred embodiment, a photodetector composed of the V(λ)-correction filter 2 and the reference silicon photodiode 5 is used as a standard unit. Therefore, if the V(λ)-correction is performed strictly, the responsivity can be calculated with a certain satisfied accuracy for any light source independent of the relative spectral distribution P(λ) of the light source. On the other hand, however, it is necessary to accurately measure the spectral transmittance $\tau(\lambda)$ of the V(λ)-correction filter 2, and the precision of the measurement thereof directly influences the accuracy of the responsivity.

Second Preferred Embodiment

A second preferred embodiment according to the present invention will be described below with reference to equations and the attached drawings.

In the second preferred embodiment, there is measured the responsivity in a manner similar to that of the first preferred embodiment, without the V(λ)-correction filter 2 of the optical measuring system of the first preferred embodiment.

Figure 4A:
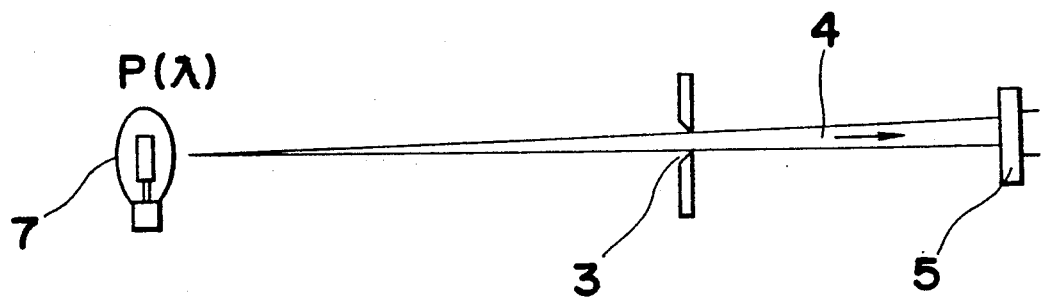
FIGS. 4a and 4b are schematic diagram showing a method for measuring a surface reflectance of the sample silicon photodiode according to a second preferred embodiment of present invention.
Figure 4B:
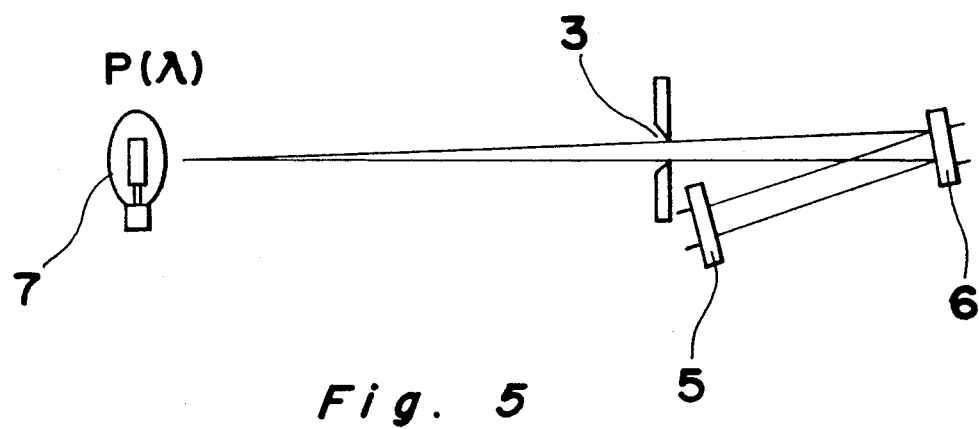

FIGS. 4a and 4b show a method for measuring the surface reflectance of the sample silicon photodiode of the second preferred embodiment. It is to be noted that the recombination loss in the rear region beyond the depletion layer of the sample photodiode and the recombination loss in the vicinity of the boundary region between the SiO$_2$ layer and the P-layer thereof are measured using the measuring systems shown in FIGS. 2 and 3 without the V(λ)-correction filter 2.

Referring to FIGS. 4a and 4b, a white light source 7 whose emitting spectrum exists within the visible spectrum has a relative spectral distribution P(λ). The measuring systems shown in FIGS. 4a and 4b correspond to the measuring systems shown in FIGS. 1a and 1b, respectively, and the difference therebetween is that there is not provided the V(λ)-correction filter 2. Therefore, the spectral transmittance $\tau(\lambda)$ in the equation (24) is expressed by the following equation:

$$\tau(\lambda) = 1 \qquad (28)$$

Thus from equation (24), the responsivity RLF [A/lm] for the photometric quantity is expressed by the following equation:

$$R_{LF} = \frac{(1 - \xi_{Rg})(1 - \xi_{og})(1 - \rho_g) \int_0^\infty P(\lambda) \cdot \lambda/k \, d\lambda}{K_m \int_0^\infty P(\lambda) \cdot V(\lambda) \, d\lambda} \quad [A/lm] \quad (29)$$

As is apparent from the equation (29), in the present preferred embodiment, there can be calculated the responsivity $R_{LF}$[A/lm] for the photometric quantity of a naked silicon photodiode in the case of using the white light source 7 having a relative spectral distribution $P(\lambda)$. After calculating the responsivity $R_{LF}$[A/lm], there can be calculated the luminous intensity etc. of the white light source 7 in a manner similar to that of the first preferred embodiment, and the photometric standard can be realized. Therefore, in the second preferred embodiment, the photometric standard can be realized without the measurement of the spectral transmittance $\tau(\lambda)$ of the $V(\lambda)$-correction filter 2.

In this case, since there is not provided the $V(\lambda)$-correction filter 2, there may be caused a large error in the responsivity $R_{LF}$ if the relative spectral distribution of the practical light source 7 is different from the data of $P(\lambda)$ to be applied to the equation (29). Therefore, there is requested a higher accuracy of the data of $P(\lambda)$.

As described above, according to the present invention, in the first preferred embodiment, it is not necessary to repeat the measurement at many wavelengths within the visible region according to the selfcalibration method using the silicon photodiode. Further, there can be calculated the responsivity for the photometric quantity of the photodetector comprising the filter for the spectral luminous efficacy correction by one measurement using the white light source, and the primary photometric standard can be realized.

Furthermore, in the second preferred embodiment, it is not necessary to measure the spectral transmittance of the filter for the spectral luminous efficacy correction since the filter is not provided, and there can be calculated the responsivity for the photometric quantity of the silicon photodiode without the filter for the spectral luminous efficacy correction.

Since the photometric standard is realized based on the self-calibration method using the silicon photodiode in the method for realizing the photometric standard according to the present invention, the photometric standard can be realized with a high accuracy, in principle. Further, it is not necessary to provide monochromatic light sources having many wavelengths, and there can be used a white light source such as a tungsten-filament lamp which is a general light source. Therefore, the system for realizing the photometric standard is more simple than the conventional system therefor, and the measurement procedure thereof is more simple than that of the conventional method, resulting in a method for realizing the photometric standard having a practical high precision.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A method for realizing a photometric standard of optical radiation based on an absolute responsivity for a photometric quantity, comprising the steps of:

measuring a surface reflectance $\rho_g$ of a silicon photodiode by projecting a beam of light from a white light source having a spectral distribution $P(\lambda)$ through an optical filter onto said silicon photodiode, said optical filter having a transparent region within the visible spectrum and having a spectral transmittance $\tau(\lambda)$, said surface reflectance $\rho_g$ being independent of the wavelength $\lambda$ of the light;

measuring a recombination of loss $\xi_{Rg}$ in a rear region beyond a depletion layer of said silicon photodiode based on a current outputted from said silicon photodiode under a condition in which a predetermined reverse bias voltage is applied thereto when projecting a beam of light from said white light source through said optical filter onto said silicon photodiode, said recombination loss $\xi_{Rg}$ being independent of the wavelength $\lambda$ of the light; p1 measuring a recombination loss $\xi_{og}$ in the vicinity of a boundary region between an insulating layer and a silicon layer of said silicon photodiode based on a current outputted from said silicon photodiode under a condition in which a predetermined bias voltage is applied between an anode electrode of said silicon photodiode and a water droplet arranged on said silicon photodiode when projecting a beam of light from said white light source through said optical filter and said water droplet onto said silicon photodiode, said recombination loss $\xi_{og}$ being independent of the wavelength $\lambda$ of the light;

calculating an absolute responsivity $R_{LF}$ {A/lm} for a photometric quantity {lm} of a photodetector composed of said silicon photodiode and said optical filter in accordance with the following equation:

$$R_{LF} = \frac{(1 - \xi_{Rg}) \cdot (1 - \xi_{og}) \cdot (1 - \rho_g) \int_0^\infty P(\lambda) \cdot \tau(\lambda) \cdot \lambda/k \, d\lambda}{K_m \int_0^\infty P(\lambda) \cdot V(\lambda) d\lambda},$$

wherein $k = 1.24 \times 10^3$ {nm·W·A$^{-1}$}, $K_m$ is a maximum spectral luminous efficacy (683 {lm/W}), and $V(\lambda)$ is a standard spectral luminous efficiency.

2. The method as claimed in claim 1, wherein another photodetector is used having a relative spectral responsivity $R_m(\lambda) \approx C_0 \cdot \lambda$, $C_0$ being a constant, within said transparent region of said optical filter upon measuring said surface reflectance $\rho_g$, further comprising the steps of:

measuring an output current $I_1$ of said photodetector when a beam of light to be incident onto said silicon photodiode is incident onto said another photodetector;

measuring an output current $I_2$ of said photodetector when a beam of light reflected from said silicon photodetector is incident onto said another photodetector; and calculating said surface reflectance $\rho_g = I_2/I_1$ based on said measured output currents $I_1$ and $I_2$.

3. A method for realizing a photometric standard of optical radiation based on an absolute responsivity for a photometric quantity, comprising the steps of:

measuring a surface reflectance $\rho_g$ of a silicon photodiode by projecting onto said silicon photodiode a beam of light from a white light source having an emitting spectral distribution only within the visible spectrum and having a relative spectral distribution $P(\lambda)$, said surface reflectance $\rho_g$ being independent of the wavelength $\lambda$ of the light;

measuring a recombination loss $\xi_{eg}$ in a rear region beyond a depletion layer of said silicon photodiode based on a current outputted from said silicon photodiode under a condition in which a predetermined reverse bias voltage is applied thereto when projecting a beam of light from said white light source onto said silicon photodiode, said recombination loss $\xi_{Rg}$ being independent of the wavelength $\lambda$ of the light;

measuring a recombination loss $\xi_{og}$ in the vicinity of a boundary region between an insulating layer and a silicon layer of said silicon photodiode based on a current outputted from said silicon photodiode under a condition in which a predetermined bias voltage is applied between an anode electrode of said silicon photodiode and a water droplet arranged on said silicon photodiode when projecting a beam of light from said white light source through said water droplet onto said silicon photodiode, said recombination loss $\xi_{og}$ being independent of the wavelength $\lambda$ of the light; and calculating an absolute responsivity $R_{LF}\{A/lm\}$ for a photometric quantity $\{lm\}$ of said silicon photodiode in accordance with the following equation:

$$R_{LF} = \frac{(1-\xi_{Rg}) \cdot (1-\xi_{og}) \cdot (1-\rho_g) \int_0^\infty P(\lambda) \cdot \lambda/k \, d\lambda}{K_m \int_0^\infty P(\lambda) \cdot V(\lambda) \, d\lambda},$$

where $k = 1.24 \times 10^3 \{nm \cdot W \cdot A^{-1}\}$, $K_m$ is a maximum spectral luminous efficacy (683 $\{lm/W\}$), and $V(\lambda)$ is a standard spectral luminous efficiency.

4. The method as claimed in claim 3, wherein a photodetector is used having a relative spectral responsivity $R_m(\lambda) \approx C_O \cdot \lambda$, $C_O$ being a constant, within the visible spectrum upon measuring said surface reflectance $\rho_g$, further comprising the steps of:

measuring an output current $I_1$ of said photodetector when a beam of light to be incident onto said silicon photodiode is incident onto said photodetector;

measuring an output current $I_2$ of said photodetector when a beam of light reflected from said silicon photodetector is incident onto said photodetector; and calculating said surface reflectance $\rho_g = I_2/I_1$ based on said measured output currents $I_1$ and $I_2$.

* * * * *